United States Patent

[11] 3,630,802

| [72] | Inventor | Theodore J. Dettling |
| | | 57th Castle Blvd., Akron, Ohio 44313 |
| [21] | Appl. No. | 54,428 |
| [22] | Filed | July 13, 1970 |
| [45] | Patented | Dec. 28, 1971 |

[54] METHOD AND APPARATUS FOR PRODUCING A COATED SUBSTRATE AND A LAMINATED PRODUCT
28 Claims, 5 Drawing Figs.

[52] U.S. Cl. .................................................. 156/231,
156/235, 156/238, 156/246, 156/500, 156/501
[51] Int. Cl. ............................................... B29b 3/00,
B29b 5/00, B29d 9/00
[50] Field of Search............................................ 264/212,
216, 165; 18/4 B, 19 R, 19 F; 118/71, 76, 257;
117/DIG. 1; 156/230, 231, 235, 242, 244, 246,
282, 390, 500, 501

[56] References Cited
UNITED STATES PATENTS

| 257,761 | 1882 | Ridgway.................... | 117/154 |
| 1,383,740 | 7/1921 | Meyer......................... | 118/77 X |
| 2,152,732 | 4/1939 | Dreymann.................. | 156/235 |
| 2,739,919 | 3/1956 | Artzt............................ | 156/239 X |
| 2,962,406 | 11/1960 | Rosa............................ | 156/231 X |
| 3,009,847 | 11/1961 | Alles et al. .................. | 156/231 X |
| 3,014,828 | 12/1961 | Reese.......................... | 156/231 X |
| 3,047,449 | 7/1962 | Coble.......................... | 156/231 X |
| 3,250,642 | 5/1966 | Parasucco et al. ........... | 156/231 X |
| 3,266,966 | 8/1966 | Patchell....................... | 156/243 |
| 3,305,392 | 2/1967 | Britt............................. | 117/59 X |

*Primary Examiner*—Carl D. Quarforth
*Assistant Examiner*—Roger S. Gaither

ABSTRACT: A coated substrate is produced by pressing a solid mass of an organic coating composition against a traveling metal carrier such as an endless metal belt, heating only that part of the coating composition mass adjacent to and contiguous with the carrier to that degree necessary to liquify the coating composition and cause a coating to form and deposit on the carrier, laminating a substrate to the coating, and then removing the resulting coated substrate from the carrier.

A three-layered laminate having the coating centrally located is produced by laminating a second substrate to the coated side of the coated substrate.

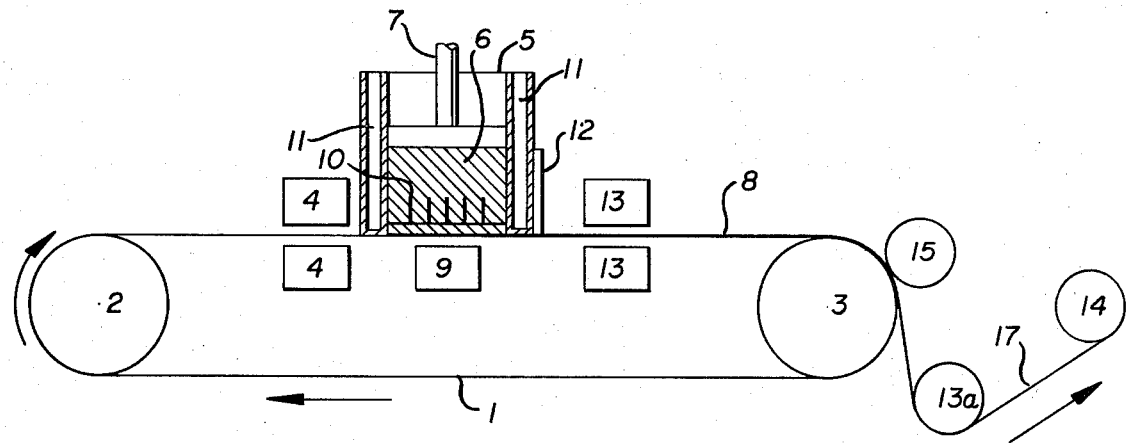
FIG. 1
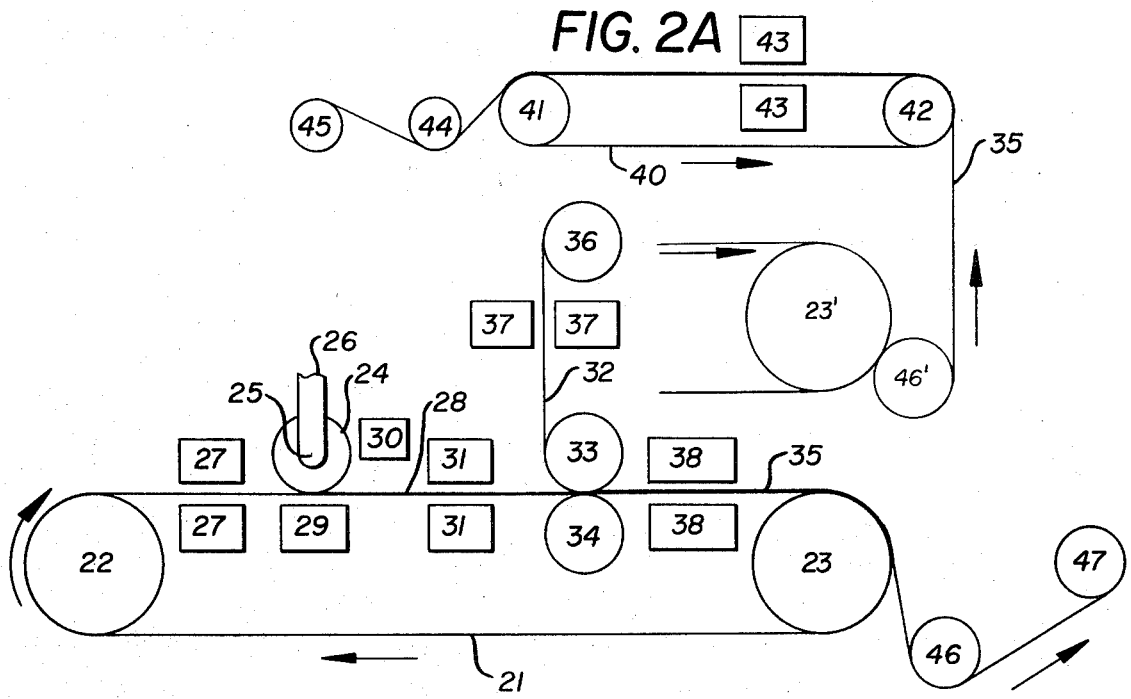
FIG. 2A
FIG. 2
INVENTOR.
THEODORE J. DETTLING
BY
ATTORNEYS

PATENTED DEC 28 1971

INVENTOR.
THEODORE J. DETTLING
BY

ATTORNEYS

METHOD AND APPARATUS FOR PRODUCING A COATED SUBSTRATE AND A LAMINATED PRODUCT

BACKGROUND OF THE INVENTION

This invention relates to a process and apparatus for forming a layer of an organic composition that can be utilized as a free unsupported film, as a coating on a coated substrate, or as an adhesive layer in a multilayered laminate.

There are presently known and utilized in the art various methods of forming layers of organic compositions that are used in the form of a free unsupported film or that constitute the coating and bonding layer in a coated substrate and a laminated product respectively.

One of the earliest and still most widely utilized method is what is commonly referred to as the "solution coating process." In this process, the organic composition is first dissolved in solvent(s) to form a liquid, free-flowing solution that is subsequently formed into a layer by applying the solution either directly to the workpiece to be coated or adhered followed by removal of the solvents, or to a carrier from which it is transferred after removal of some or all of the solvents to the workpiece. There are a number of disadvantages inherent in the solution coating process, due primarily to the need to use organic solvents. Because of the potential toxicity and combustibility of organic solvents, there is a direct hazard to the health and well-being of users of the solution coating process. In addition, when no effort is made to recover such solvent(s), they constitute an additional source of no small magnitude to the constantly increasing pollution of our air environment. A further real disadvantage resides in the poor economics of solution coating processes. Besides the obvious extra cost of the solvents or the step of recovering them, there is the extra cost burden imposed by the fact that coating solutions must usually be made at low total solids to give workable viscosity. Thus, only a very thin layer of coating can be obtained, and thicker layers when required can only be obtained by multiple coating operations.

In an effort to minimize the difficulties and disadvantages of the solution coating process, there was evolved processes wherein the organic compositions were dispersed either in water, the so-called "latex coating process," or in a nonfugitive, high-boiling organic liquid that would solvate at elevated temperatures the polymer used in the organic composition, the so-called "plastisol coating process." While eliminating some of the disadvantages of the solution process, each possesses inherent disadvantages and limitations. Thus, the latex process requires that all the constituent ingredients of the organic composition be homogeneously and finely dispersed in water, an expedient that is expensive and requires the utilization of hydrophilic dispersing agents that cause the resulting layer to exhibit sensitivity to water. As in the solution coating process, the latex coating process also has total solid limitations imposed by viscosity considerations, which although generally not as severe still limit the thickness of the layer that can be formed in a single operation. The plastisol process on the other hand is restricted in the main to polymers and copolymers of vinyl chloride, and is primarily used for film, coatings and adhesive applications that require or can tolerate a flexible, plasticized organic composition.

Alternate routes that simultaneously evolved in the prior art to replace the solution coating process, relied on various methods of mass or bulk manipulation of the organic composition to form layers, films or coatings.

One of the earliest, and still widely utilized mass methods, is the so-called "calandering process" wherein a thermoplastic organic composition is squeezed between heated iron calander rolls to form a continuous layer that is either stripped off as an unsupported film or laminated to a flexible substrate. While suitable for a variety of rubber and plastic compositions, the calandering process likewise has definite limitations that make it unsuitable for many materials and applications. Two major deficiencies are the requirements first that the material to be calandered be preheated to make it sufficiently fluid to be squeezed into a layer, and second that a considerable body of the material called the bank, be maintained in the nip between the pair of squeeze rolls. Because of these requirements, it is not uncommon, even in high speed operations for some of the calandering composition to be maintained at elevated temperatures for a time period on the order of minutes. Because of this inherent characteristic, the calandering process cannot be utilized for compositions that either readily degrade or quickly cure at elevated temperatures. Further, there is a practical limit to the thinness of the layers that can be obtained, with the minimum thickness being of the order of 3 mils. It is a further characteristic of calandering that only stocks having a wide softening and melting temperature range (usually 30°-40° F.) can be processed. Because of the mass and size of calander rolls, it is difficult to quickly change and control their temperatures thus making calandering less adaptable for short runs of coating or film production. For the same reason, there is a practical limit to the maximum roll temperatures that can be utilized, it generally not exceeding about 400° F. Because of the size of the rolls needed to withstand the squeezing pressure involved in forming layers, the maximum width that can be achieved by calandering generally does not exceed about 84 inches. A calander because of its size and complexity is expensive both to initially purchase and to subsequently operate and requires a high degree of skill and sophistication for operation and maintenance.

In an attempt to alleviate some of the deficiencies of the calandering process, the well-known extrusion process was adapted for the preparation of films and coated substrates. While the extrusion process permitted a decrease in the thickness of both film and coating layers to below 1 mil, it like the calandering process still subjects the composition while it is being thermoplasticized in the barrel to an extended period of exposure to elevated temperature, thus making it unsuitable for thermally sensitive compositions. Further, because of the requirement that the stock be essentially liquid as it emits from the die in the production of thin film and coated substrates, extremely high temperatures on the order of 550° to 650° F. must be employed, and only compositions containing polymers having a rather narrow and limited melt index (indicative of the molecular weight average and distribution) can be utilized.

Although less expensive than a calander, an extruder and its auxiliary web-handling equipment is not by any means inexpensive. Like the calandering process, the extrusion process for producing films and coated substrates is an extremely sophisticated process requiring extensive monitoring and control devices. Because of the quality of the film is extremely dependent on temperature uniformity across the die, it does not adapt itself well to short production runs. When film thickness of extruded film or coating are decreased by the universally used practice of drawing down the extruded films, undesirable residual stresses can be introduced.

A further alternate method of forming thin layers of organic material is what is known as the "hot-melt process" that is employed principally in adhesive applications. In this process, a thermoplastic adhesive, capable of being melted to a liquid at elevated temperatures, is heated in a pot and then metered to an applicator, which might be a heated nozzle, wheel or roller, that applies the melted adhesive to the adherends, which are then pressed together. Because of the long residence time in the melt reservoirs, only thermally stable compositions can be used. Additionally, the need to completely liquify the composition further limits the type and molecular weight of polymers that can be used in the hot-melt compositions. Generally, only low-molecular-weight polymers or polymers that have been highly plasticized can be utilized.

Another mass method employs powdered thermoplastic resins that are applied as a layer of powder directly to a substrate and subsequently fluxed by heat to give a continuous coating or film. When desired, a second substrate is laminated to the fluxed powder layer to give a three-layered laminate. An obvious disadvantage of this process is the requirement that only compositions that are or can be made in a particulate form can be employed. A further disadvantage is the difficulty in producing thin layers of uniform thickness. Additionally, when heat-sensitive substrates are employed, only those compositions that flux below the heat-sensitive temperature of the substrate can be used.

A still further method of applying a coating of a solid composition is by rubbing a solid block of a coating composition across the surface of a substrate or workpiece, thereby causing some of the composition to be transferred to the substrate surface. Illustrative of such processes are such everyday occurrances as writing with a pencil, drawing with crayons, greasing a cakepan with butter, and applying lipstick. In all of these processes, the coating material is limited to those that are sufficiently soft and of such low cohesive strength as to breakaway from the coating mass and sufficiently adhesive to stick to the base, while the base must possess sufficient integrity and strength to withstand the shear forces imparted by the rubbing action. To impart these requisite properties to coating materials that are deficient therein at ambient temperatures, the expedient of heating the workpiece to the melting point of the coating material has been used. For example, U.S. Pat. No. 1,383,740 shows the preparation of an electric insulating web by pressing a solid block of a thermoplastic varnish composition against one side of a moving fibrous web such as paper, that is conveyed over a heated surface for the purpose of melting the varnish and causing it to adhere to the web. It is axiomatic that for this heat-modified rubbing method to operate satisfactorily, the base or workpiece must be capable of withstanding the elevated temperatures and the compression and shear forces that it is subjected to in order to melt the block of coating composition and form the desired continuous and adherent coating layer. Thus, for instance, it could not be used when it was desired to coat substrates that themselves were either thermoplasticized or thermodegraded by the coating temperatures required to melt the coating block, or on substrates that are so weak in cohesive strength and that they would be torn apart by the rubbing compression and shear forces encountered.

In other words, the structure and material composition of the workpiece are limiting factors that determine the type of coating material that can be applied employing processes of the type taught by U.S. Pat. No. 1,383,740, making them less than universal in their applications and in fact seriously limiting their scope of usefulness.

Further, it seems manifest that the efficiency and speed of rubbing a mass of coating material unto a workpiece heated from its backside would be dependent on the heat conduction properties of the workpiece material. Because of this, workpieces consisting of poor heat-conducting materials such as fibrous webs (paper, fabrics, etc.) or plastic webs such as polypropylene, mylar or cellophane could not be coated rapidly.

SUMMARY OF THE INVENTION

Having in mind the characteristics of the various prior art processes hereinbefore described, it is a principal object of the present invention to provide a unique process and apparatus for producing a film, a coated substrate or a laminated product that obviates or minimizes the deficiencies and limitations of these processes while at the same time providing a method and apparatus having greater latitude with regard to the various substrates and coating, adhesive and film compositions that can be used. It is a further principal object to provide mass film forming and coating processes that utilize simple and less expensive equipment and that can be operated at lower costs and with greater facility.

More specifically, it is an object of this invention to provide methods and apparatus for producing an unsupported film, a coated substrate, or a laminated product that either eliminates or reduces to a minimum the need for solvents and their attendant disadvantages including pollution of our environment, combustibility, toxicity and increased costs.

It is a further specific object to provide a mass layer-forming process that exposes the layer-forming composition to elevated temperatures for considerable lesser time than the present methods known to the art, and which consequently allows compositions to be employed that are hypersensitive to elevated temperatures and cannot presently be used.

Further, it is an object of this invention to provide a mass process that utilizes high temperatures to thermoplasticize the layer-forming composition, thus allowing the production of thin layers of layer-forming compositions that cannot be made by presently known mass layer-forming processes.

A still further object is the provision of a process that can produce thin layers, essentially devoid of residual stresses.

Finally, it is an object of this invention to provide a process that has greater flexibility with regard to the length and width of the layer that is formed, and that is more universal with regard to the types and compositions of coatings and substrates that can be used.

These and still other objects and advantages of my invention process and apparatus, which will be readily apparent to those skilled in the art from the following description and drawings, are obtained by my invention that comprises in its simplest and most fundamental embodiment the following steps performed in sequence on a moving metal carrier such as a moving endless metal belt or a revolving, hollow, metal drum.

1. At a first station pressing a solid mass of an organic composition that is capable of softening and becoming at least quasi-liquid at elevated temperatures and that it is desired to form into a layer that can be subsequently employed either as an unsupported film, a coating, or an adhesive and that for clarity hereinafter will be called the coating composition onto a moving metal carrier, heated to a temperature sufficient to at least quasi-liquify the surface of the coating composition mass in contact with the heated carrier and thereby to cause a layer of the coating composition hereinafter called the smear coating, or coating to be deposited onto the carrier while maintaining the major portion of the coating composition mass at a temperature below that at which it becomes liquid or quasi-liquid.

2. At a second station, optionally if required, further heating the smear coating to further liquify it and cause it to flow and form a layer of more uniform thickness and smoothness and/or to cause it to more readily wet a substrate when a coated substrate or laminated product is to be produced.

3. At a third station, pressing a substrate to be coated or made into a laminate into the liquid or quasi-liquid smear coating layer with sufficient pressure to ensure the desired area contact between the substrate and the smear coating to give a coated substrate.

4. At a fourth station, solidifying the smear coating layer as by cooling if thermoplastic or by curing followed by cooling normally if thermosetting to cause the coated substrate to be releasable from the carrier.

5. At a fifth station, removing the coated substrate from the carrier.

6. When it is desired to produce an unsupported film the lamination of the substrate to the smear coating at station 3 is eliminated and the smear coating layer is solidified by cooling if thermoplastic or by curing if thermosetting followed by cooling normally, and removed from the carrier to give an unsupported film.

7. When a laminated product is desired, a second substrate is laminated to the reactivated smear coating layer of the coated substrate.

BRIEF DESCRIPTION OF THE DRAWING

FIG. 1 is a diagrammatic side elevational view of an apparatus for forming a free unsupported film.

FIG. 2 is a diagrammatic side elevational view of an apparatus for forming a coated substrate showing a modified method of applying the smear coating to the carrier, and further being adapted to cure thermosetting coatings.

FIG. 2A is a diagrammatic side elevational view of an apparatus used in combination with the apparatus of FIG. 2 to produce a coated substrate having a smoother coating.

DETAILED DESCRIPTION

Figure 3:
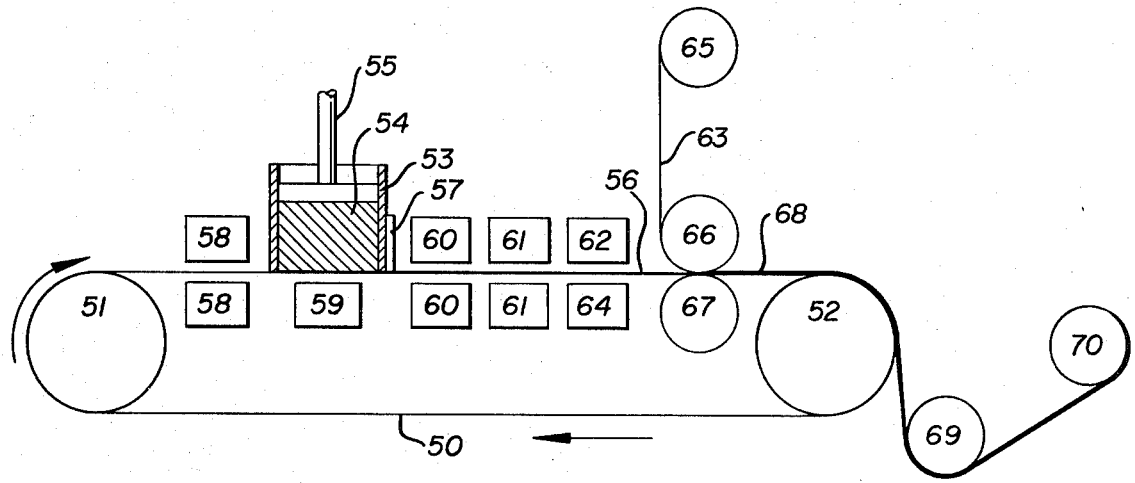
FIG. 3 is a diagrammatic side elevational view of an apparatus for forming a coated substrate in which the substrate is a thermoplastic material that undergoes heat deformation and/or degradation.

In the apparatus of FIG. 1 used to make an unsupported film, there is illustrated an endless, metal belt 1 running in a clockwise direction around guide rolls 2 and 3. The belt 1 is heated by heating means 4,4, which could be radiant heaters, gas flames, or a hot air oven, located either above, below, or both above and below the belt 1, to a temperature that will liquify or quasi-liquify a coating composition 6 that is to be made into an unsupported film. The belt 1 then passes under a feed box 5 disposed above the belt 1 and containing a solid or virtually solid mass of the coating composition 6. The mass of the coating composition 6 is pressed against the surface of the belt 1 by pressure means 7, which could be a weighted or springloaded plate, or a hydraulic or pneumatic energized plate. As the belt 1 passes under the feedbox 5, the surface of the coating composition mass 6 in contact with the belt is liquified or quasi-liquified and a layer 8 of the coating composition 6 is formed on the surface of the belt 1. There is shown, if required to assist in melting the belt-contacting surface of the coating composition mass 6, a second heating means 9 located beneath the belt 1 at the position of the feedbox 5. Alternately, heating means 9 could be supplemented or replaced if not needed, by one or more idler rolls, not shown, to support the belt 1 and better enable it to resist any deformation occasioned by the pressing force of the coating mass 6 onto the belt 1.

Inside of the feed box 5, there is illustrated vertically extending fins 10 that can be either heated or cooled by a circulating heat exchange fluid, not shown, for the purpose of either heating or cooling the coating composition mass 6, in the proximity of the belt 1, for the purposes, depending on the conditions of operation and the type of coating composition, of either assisting in the melting of the surface of the coating composition mass 6 in contact with the belt 1 or preventing the coating composition mass 6 from becoming overheated in case it is thermally sensitive. Additionally, and for the same purposes, feedbox 5 can be jacketed as illustrated by the jacketed space 11 for circulating of a heat-exchange fluid. In place of a heat transfer fluid, when it is only desired to heat the coating composition mass 6, fins 10 and feedbox 5 can be electrically heated. To control the thickness of the smear coating layer 8, there is slidably mounted on feedbox 5, a gate 12 that can be raised up and down. In addition to gate 12, which may not always be required, the thickness of the coating layer 8 can be controlled by a number of independent factors including the speed and the surface texture and temperature of the belt 1, the force with which the coating composition mass 6 is pressed against the belt 1 and finally the viscosity of the melted coating composition mass 6 in contact with the belt 1.

The smear coating layer 8 then passes to an optional third heating means 13,13, which like heating means 4,4 can be disposed either above, below, or both above and below the belt 1, where, if required, the smear coating 8 can be further liquified and caused to flow out and form a layer of more uniform thickness and smoothness. Not all coating compositions 6 will require auxiliary heating means 13,13, in which case the smear coating 8 goes directly around guide roll 3 which is cooled as by an internally circulated cooling fluid. As the belt 1 and coating layer 8 pass around the cooled guide roll 3, the coating layer 8 is cooled and caused to solidify. When the smear coating layer 8 has sufficiently cooled and solidified to gain tensile and tear strength, it is stripped off of the belt 1 by stripper roll 13/a as an unsupported film 17 and passed to windup roll 14. In place of or supplementing the chilled guide roll 3, other well known cooling means such as flowing streams of chilled air or water spray directed against either the coating layer 8 and/or the belt 1 can be used.

In addition to the function of smoothing out smear coating layer 8, heating means 13,13 can be used to cure the coating layer 8 when it is made from a thermosetting coating composition. When a thermoset film 17 is produced, it may not be necessary or desirable to cool the coating layer 8 prior to stripping it off of the belt 1. In certain instances, coating layer 8 after being cured may have sufficiently reduced adhesion to the belt 1 and sufficient tensile strength to be taken off the belt 1 hot by stripper roll 13/a as an unsupported film 17. When the film 17 is wound hot on windup roll 14, further thermosetting can occur to give the desired state of cure.

In place of windup roll 14, the film 17 can be cut into lengths and stacked.

When the surface of the film 17 is to be embossed or textured, the surface of the belt 1 is textured or embossed with the desired configuration. Alternately, this can be achieved by utilizing an embossing roll 15 having the desired surface configuration in pressing relationship with the guide roll 3 at a position such that only the bottom of the coating layer has solidified while the top is still sufficiently fluid to be embossed. Embossing roll 15 can be cooled to promote retention of the embossed configuration in the film 17. When both a textured belt 1 and the embossing roll 15 are employed, it is possible to produce a film 17 having an embossed or textured surface on both sides. Further, films having adequate tear and tensile strength properties can be taken off the belt 1 by the embossing roll 15 when it is used.

In forming unsupported films utilizing the smear coating process and apparatus illustrated in FIG. 1, the film composition can be any organic composition that is capable of becoming at least quasi-liquid at elevated temperatures and can be either thermoplastic or thermosetting. Thus, there can be used thermoplastic compositions such as low- and high-density polyethylene, polyropylene, nylon, polyethylene phthalate, polycarbonates, polysulfones, polyphenylene oxide, vinyl chloride polymers and copolymers, polyvinyl acetate, and so forth either alone or in compatible admixtures with each other and further admixed with other auxiliary compounding ingredients such as fillers, colorants, antidegradants, plasticizers, processing aids and so forth as is well known in the art. Illustrative of thermosetting organic compounds that can be used are solid amino- or phenol-type aldehyde resins, thermosetting urethane or urethane-urea resins, natural and synthetic rubber compounds containing curing agents and so forth. The thermosetting compositions can be used in admixture with each other or with other thermoplastic compounds and, like the thermoplastic composition, may be further admixed with other auxiliary compounding ingredients such as fillers, pigments, colorants, antidegradants, stabilizing agents, plasticizing agents, processing aids, curing agents, and so forth as is well known in the art.

In the coating apparatus of FIG. 2 that can be used to make either a thermoplastic or thermosetting coated substrate, an endless metal belt 21 is shown running clockwise around guide rolls 22 and 23. In place of the feedbox 5 and pressure means 7 used in the apparatus of FIG. 1, there is employed in the apparatus of FIG. 2, a modified means of forming the coating layer that consists of a mass of the coating composition molded into a cylinder 24, around a centrally located axle 25 that is mounted and revolves on support and pressure means 26. The belt 21 preheated by heating means 27,27 to a temperature sufficiently high to liquify the coating composition as it passes under the cylindrical coating mass 24 causes the surface of the cylinder 24 in contact with the belt 21 to become liquified and deposit a layer 28 of the coating composition. Mounted under the belt 21 at the position where the cylinder 24 is pressed against the belt 21, there can be employed a second heating means 29 and/or a belt-support means 29 consisting of one or more idler rolls.

In applying the coating layer 28 from the coating composition cylinder 24, different modes of action can be used. Thus, the cylinder 24 can be allowed to freely revolve in contact with the moving belt at the same peripheral speed as the linear speed of the belt 21 or it may be power driven by external driving means, now shown, operating on the axle 25 in either the same direction (counterclockwise) or in the opposite direction (clockwise) as the movement of the belt 21. When revolved by power means in the same direction as the belt 21, the cylinder 24 of hot coating composition may be revolved at either a slower or faster peripheral speed than the linear speed of the belt 21.

When required, the cylindrical mass of coating composition 24 can be cooled by one or more streams of chilled air directed against its periphery at one or more points above the belt as is diagramically illustrated by box 30. Additional cooling of the cylinder 24 can be achieved by utilizing a hollow cored axle 25 through which a cooling fluid is circulated.

The thickness of the coating layer 28 is controlled by the force pressing the cylindrical coating mass 24 against the belt 21, the speed, temperature and surface texture of the belt 21, and the viscosity of the melted liquid or quasi-liquid coating composition in contact with the belt 21.

In connection with the surface texture of the belt 21, when a pebbly or granulated surface is employed, a thicker layer 28 may be produced. Further, when the belt 21 has a sharp-edged granulated surface like that of a rasp and the cylindrical mass 24 is either revolved opposite (clockwise) to the movement of the belt 21 or at a different peripheral speed than the belt speed when revolving in the same direction (counterclockwise), then the coating composition may be torn off the periphery of the cylinder 24 in the forms of particles or shreds, thereby providing a means of depositing a thicker layer of the smear coating 28. When used in this mode, optimum shredding may be obtained by either decreasing or completely eliminating the heating of the belt 21 by heating means 27 and 29, in order to increase the compressive strength of the coating cylinder 24 and to impart properties to the coating composition that make it more amenable to shredding and tearing.

The coating layer 28 is then carried to heating means 31,31 where it can, optionally if required, be further liquified and thereby caused to flow out and form a layer of more uniform thickness and smoothness, and/or to cause it to more readily wet the substrate 32 that is subsequently applied to it. When the coating apparatus of FIG. 2 is operated in such a manner that the coating composition is deposited on the belt 21 in particulate or shredded form, as previously described, then heating means 31,31 are manditory for the purpose of causing the particles or shreds to fuse together into a unitary, continuous film and to liquify the surface of the layer for subsequent lamination with the substrate 32. However, for many coating compositions when the layer of smear coating 28 is formed solely by liquification of the smear coating mass 24 in contact with the heated belt 21, heating means 31,31 need not be used. Especially in the case when a rapidly thermosetting coating composition is being used, heating means 31,31 would not be used.

The smear coating layer 28 then passes between laminating roll 33 and support roll 34 where it is laminated to a flexible substrate 32 fed from a supply roll 36 to give a coated substrate 35. To improve the adhesion of substrate 32 to the coating layer 28, it may, optionally if required, be preheated by heating means 37,37. Laminating roll 33 forces the substrate 32 into the coating layer 28 with sufficient pressure to give the desired penetration and degree of adhesion. For impervious substrates 32 such as metal foils and plastic film, sufficient force is sued to give essentially 100 percent area contact.

If the smear coating 28 is thermoplastic, the coated substrate 35 is then cooled by guide roll 23 that has a cooling liquid circulated therethrough and taken off the belt 21 by a takeoff roll 46 and wound up on a windup roll 47.

When the smear coating 28 is thermosetting, the coated substrate 35 is passed through a fourth heating means 38,38 that will impart to it the desired degree of cure prior to being cooled and stripped off the belt 21. As with an unsupported film, a thermosetting coated substrate may, with certain smear coating compositions, be stripped off the belt warm or hot, and the balance of the cure achieved on the takeup roll 47 in storage.

When the coating is formed on either a rasp-surfaced belt 21 by rotation of the cylinder 24 that produces shreds or particles of the coating composition or on a textured (granulated or pebbly) belt 21 and it is desired to obtain a smooth-surfaced coated substrate 35, the apparatus of FIG. 2A is used in combination with the apparatus of FIG. 2. When the apparatus of FIG. 2A is used, heating means 38,38 is normally eliminated and the coated substrate 35 after passing around the cooled guide roll 23' a distance sufficient to solidify the coating layer 28 and allow the coated substrate 35 to be stripped from the belt 21 by a stripper roll 46' is directed up to a second endless belt 40 moving counterclockwise around guide rolls 41 and 42. The coated substrate 35 is carried by the second endless belt 40 through heating means 43,43 that serve the dual function of reliquifying the coating layer 28 thereby causing it to flow out and form a smooth and uniform thickness coating layer and further, in the case of a thermosetting coating, curing it to the desired degree. The coated substrate 35 is then passed around the guide roll 41 which is cooled by a circulating cooling liquid to a stripper roll 44, where it is taken off the belt 40 and wound up on a takeup roll 45. Here again, with some thermosetting coatings, it may be desirable to take the coated laminate 35 off the belt 40 while still hot to facilitate further thermosetting of the coating layer 28 in storage on takeup roll 45.

In place of the revolving cylindrical coating mass 24, there could be used with equal facility in the apparatus and coating process shown in FIG. 2, the feedbox 5, pressure means 7, gate 12 and cooling or heating means 10 and 11 illustrated in the apparatus of FIG. 1.

The flexible substrate 32 that is laminated or pressed into the coating layer 28 in the process and apparatus of FIG. 2 could be any material that is flexible and which it is desired to coat such as/a sheet or foil or steel, copper or aluminum, a sheet or film of plastic material such as Mylar, PVC, polyethylene, polyproplene, cellophane, etc. or a fibrous web such as a textile fabric or a sheet of paper or cardboard or a thin sheet of wood.

FIG. 3 shows a modified version of the coating apparatus of FIG. 2 that is adapted to provide a coating on a plastic film substrate derived from plastics such as polyethylene polypropylene, plasticized PVC and so forth that can be distorted or degraded when the temperature of the layer smear coating is appreciably higher than the heat distortion or degradation temperature of the plastic film. In this apparatus, an endless metal belt 50 is shown traveling clockwise around guide rolls 51 and 52. As the belt 50 passes under a feedbox 53, containing a solid mass 54 of the coating composition that is pressed against the belt by pressure means 55, a layer 56 of the coating material is smeared onto the belt 50. Here as in the processes of FIGS. 1 and 2, the thickness of the layer 56 is controlled by the speed, surface texture and temperature of the belt 50, as well as a metering gate 57 slidably mounted on feedbox 53. The belt 50, prior to passing under feedbox 53, is preheated by heating means 58,58 as well as being optionally further heated by heating means 59, disposed directly beneath the belt at the position where the feedbox 53 is located. The belt 50 can be supported at heating means 59, by one or more idler rolls to prevent deformation caused by the force of the coating composition mass 54 being pressed against the belt 50.

The smear coating layer 56 then passes to heating means 60,60 where it can optionally be further heated, if required, to effectuate a smoother and more uniform coating. The coating layer 56 then passes through cooling means 61,61 which as previously described could be a series of chill rolls on the underside of the belt 50, a stream of chilled air directed against the coating layer 56 and/or belt 50, or only a stream of chilled water directed against the underside of the belt 50 for the purpose of lowering the heat content of the coating layer 56. The coating layer 56 then passes to optional heating means 62 which, if required, remelts or liquifies only the surface of the coating layer 56 sufficiently to ensure adequate wetting and adhesion to the plastic substrate 63. At the same time as the top surface of the coating layer 56 is being remelted, the underside of the belt 50 can be further cooled, optionally if desired and required, by cooling means 64 which again might be chill roll(s) or a stream of chilled water directed against the bottom side of the belt 50. The flexible plastic substrate 63 fed from a supply roll 65 is then laminated or pressed into the coating layer 56 by a laminating roll 66 and a support roll 67 to give a coated plastic substrate 68. The coated plastic substrate 68 is then immediately cooled by cooling means which in this illustration is guide roll 52 that is cooled by an internally circulated cooling liquid and then taken off of the belt 50 by a stripper roll 69 and wound up on a windup roll 70. In the modified apparatus and process of FIG. 3 in many instances, the auxiliary heating means 60,60 will not be required because of the subsequent heating of the top surface of the coating layer 56 by heating means 62. Because only a minor portion of the thickness of the coating layer 56 usually less than 33 percent is at a high temperature, there is an insufficient quantity of latent heat in the coating layer 56 to raise the temperature of the plastic substrate 63 to its heat distortion or degradation temperature and thereby heat distortion and/or degradation of the plastic substrate 63 is effectively obviated.

With some coating compositions and apparatus operating conditions, cooling means 61,61 may not be required, because adequate reduction of the heat content of the coating layer 56 can be achieved by cooling means 64 alone. In such instances, heating means 62 also may not be required because the top surface of coating layer 56 may retain sufficient tackyness to wet and adhere to the plastic substrate 63. More rapid cooling of the coated substrate 68, and hence further minimization of the heat distortion and degradation problems when desirable, can be achieved by cooling either the laminating roll 65, or the support roll 67 or by cooling both rolls with an internally circulating cooling fluid.

Figure 4:
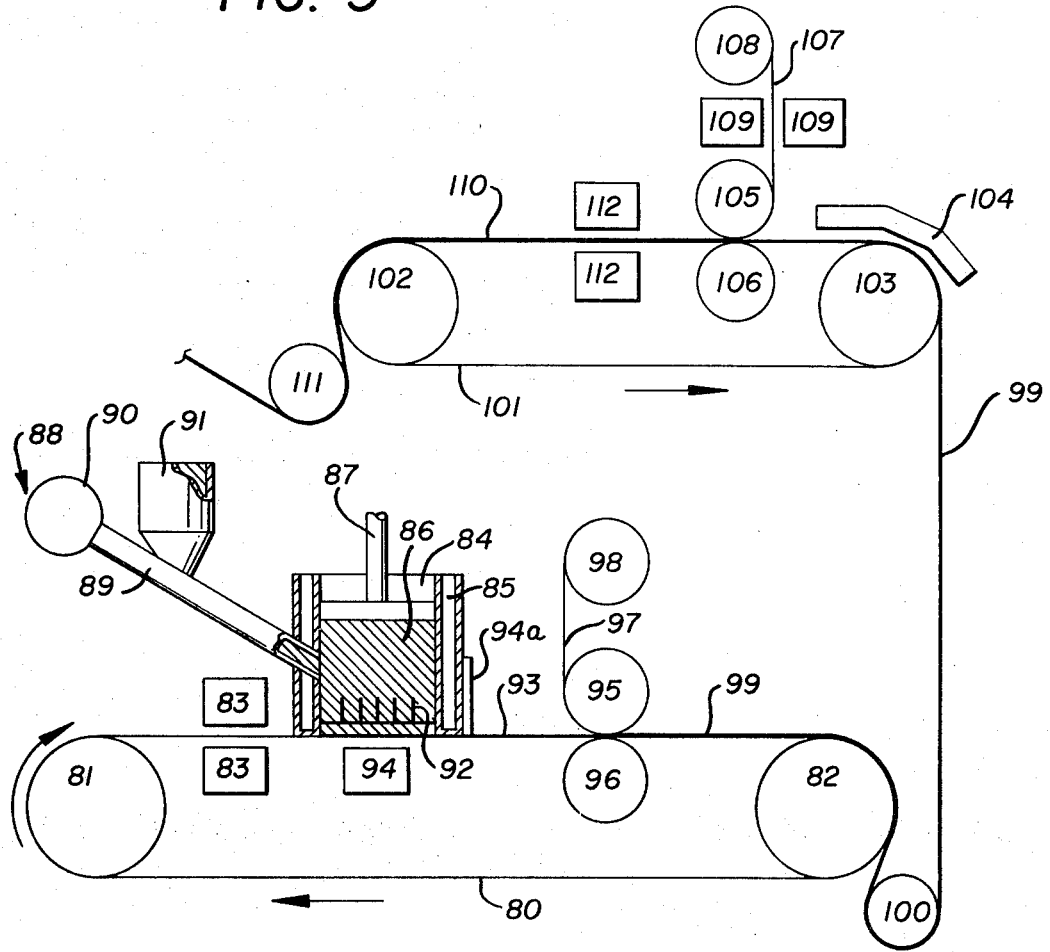
FIG. 4 illustrates a process and apparatus for producing in one continuous operation a three-layered laminate having the smear coating centrally located and further illustrates a method and apparatus for continuously feeding the coating composition to the coating apparatus.

In the apparatus of FIG. 4, adapted to produce a three-layered laminate having the smear coating centrally located and illustrating a method and an apparatus for continuously feeding the coating composition to the coating apparatus of this invention, there is shown an endless metal belt 80 traveling clockwise around guide rolls 81 and 82. The endless metal belt 80 is preheated by heating means 83,83 to a sufficiently high temperature to at least quasi-liquify the coating composition which in this illustration is an adhesive composition 86 capable of adhering together the two substrates that are to form the two outer lamina layers of the three-layered laminate. The heated belt 80 then passes under a feedbox 84 containing the mass of adhesive composition 86 and having jacketed sidewalls 85 through which a heating or cooling liquid can be circulated for the purposes of either heating or cooling the adhesive composition mass 86. Additional heating or cooling of the adhesive composition mass 86 when desired is obtained by vertically extending heating or cooling fins 92 that are located at the bottom of the feedbox 84 in the proximity of the belt 80 and through which is circulated a heated or cooled fluid. The adhesive mass 86 is pressed against the belt 80 by pressure means 87 which is adapted to maintain a constant desired pressure against the belt 80.

To permit long, continuous, uninterrupted coating runs, the apparatus of FIG. 4 is equipped with an adhesive composition feeding means 88 that continuously feeds the adhesive composition 86 to the feedbox 84, and that consists of an extruder 89 driven by power means 90 and a material feed hopper 91. In the operation of feeding means 88, the adhesive composition 86 need only be heated sufficiently to allow it to be extruded into the feedbox 84 since there is no need to thermoplasticize it to that degree required for conventional film or coating extrusion processes. Thus, the adhesive composition 86 can be passed through the extruder 88 at lower temperatures, essentially in the solid state if required. When a particulate coating or adhesive composition is employed, it can be extruded into the feedbox 84 in particulate form, if desired to minimize its history of heat exposure, where it is sintered or fluxed together by the heat of the belt 80, supplemented if required by the heating of fins 92 and the jacketed feedbox 84 prior to contacting the belt 80.

As the belt 80 passes under the feedbox 84, a layer 93 of the adhesive composition 86 is formed and deposited on the belt 80. To accelerate the melting or quasi-liquification of the adhesive composition mass 86 in contact with the belt 80, there can optionally be used, if desired, a second heating means 94 located beneath the belt 80 at the location of the feedbox 84. In place of or supplementing the heating means 94, there can be used one or more idler rolls to support the belt 80 against the pressing force of the adhesive composition mass 86. The thickness of the smear coating layer 93 is controlled by the temperature, speed and surface texture of the belt 80, the pressing force of the adhesive composition 86 against the belt 80 and the viscosity of the melted coating composition 86 in contact with the belt 80. Further control of the coating layer thickness 93 can be achieved by a vertically slidable gate 94 mounted on the downstream side of the feedbox 84.

The melted smear coating layer 93 then passes to a laminating roll 95 and a support roll 96 where it is laminated to a flexible substrate 97 fed from a supply roll 98 to give a coated substrate 99. The coated substrate 99 then is cooled by the guide roll 82 that is externally cooled by a circulating cooling liquid and taken off the belt 80 by a stripper roll 100.

The coated substrate 99 is then directed to a second endless metal belt 101 running counterclockwise around guide rolls 102 and 103 where the top surface of the coating layer 93 is retackified by heating means 104, which in FIG. 4, is shown disposed around guide roll 103 that, if desired, can be cooled when either of the outer substrates are heat sensitive or heat distortable. The heat-reactivated coated substrate 99 then passes to a pressure laminating roll 105 and a support roll 106 where it is laminated to a second substrate 107 fed from a supply roll 108 and optionally preheated by heating means 109,109 if required to facilitate adhesion to form a three-layered laminate 110.

If the adhesive layer 93 is thermoplastic, the three-layered laminate 109 is then immediately cooled by the guide roll 102, which is internally cooled by a circulating cooling liquid, and taken off the belt 101 by a stripper roll 111 and directed to a windup roll, now shown, or to a device for cutting the laminate 110 into the desired lengths. When the adhesive layer 93 is thermosetting and/or one of the lamina layers 97 or 107 is thermosetting, then, if desired, the laminate 109 can be cured by a heating means 112,112 prior to being cooled and taken off the belt 101.

In addition to cooling by guide roll 102, when the smear adhesive layer 93 is thermoplastic, the laminate 110 can be more rapidly cooled by using a laminating roll 105 and a support roll 106 that are chilled such as by means of a cooling fluid circulating therethrough. When the adhesive layer 93 is thermosetting and is either cured or partially cured by heating means 112,112, then it may not be necessary or desirable to cool the laminate 110 prior to taking it off of the belt 101. When removed from the belt warm or hot, the laminate 110 can further cure in storage to impart the desired state of cure to the adhesive layer 93.

The apparatus of FIG. 4 is adapted to laminate flexible plastic films which exhibit heat distortion or degradation properties due to the provision in the second laminating step of the heating means 104 directly above a cooling means 103 for the purposes of minimizing the heat content of the coated substrate that is to be laminated. When the laminate substrates are not heat sensitive, then heating means 104 could be disposed further downstream on the belt and/or guide roll 103 would not have to be cooled.

Further, the coated substrate 99, in place of the consecutive lamination procedure shown in FIG. 4, if desired, could be laminated to the second substrate 107 to produce the three-layered laminate 110, at some subsequent time, employing either a heat or solvent reactivation of the coating layer 93 by methods well known in the art.

The endless metal belt employed in the apparatus and process of FIGS. 1 to 4 is made from a metal or metal alloy that can withstand the thermal stresses induced by the frequent and rapid heating and cooling steps and the mechanical stresses that characterize the apparatus and process of this invention. Further, the metal or alloy chosen for the carrier ideally should have the largest possible heat capacity and heat conduction characteristics and have resistance to any corrosion effects of the coating composition. Depending upon the magnitude and frequency of the heating and cooling steps as well as the necessary corrosion resistance, the endless metal belt can be made from alloys of steel, titanium, nickel, aluminum, copper and so forth as is known to those skilled in the metalurgical arts. Rapid heating and cooling of the metal belt is facilitated by employing as thin a metal belt as possible.

In place of a moving endless belt, there can be used in the apparatus and process of FIGS. 1 to 4, a revolving, hollow metal drum of appropriate diameter to accommodate the required heating and cooling steps in addition to the coating forming means that are disposed around its periphery. To expedite the heating and cooling steps, the skin of the drum should only be as thick as is required to give the necessary structural rigidity. The metal employed in the circumference of the drum will be chosen to accommodate the mechanical and thermal stresses imposed on it by the various heating and cooling steps used in the invention and to be resistant to any corrosion induced by the coating composition used.

In both the endless metal belt and the hollow metal drum, the use of alloys of aluminum and copper when possible facilitate the heating and cooling steps of the invention process.

In coating processes employing coating compositions having relatively low-melting-point temperatures, that is not much in excess of 400° to 600° F., it may be desirable, to facilitate release of the smear coating, to use a metal carrier having a coating or layer of a thermally stable, low-surface-energy composition such as Teflon or a silicone resin either smooth or embossed depending on the desired surface texture of the film or coated substrate.

The various heating means that can be employed in the apparatus and process of this invention are well known to those skilled in the art. For example, heating means suitable for the endless metal belt, the hollow metal drum and the smear coating layer of this invention are given in U.S. Pat. No. 2,451,597 that is directed to a method of relieving residual stresses in a calandered plastic film by annealing the film on a heated endless metal belt. As this patent shows, in addition to the gas burners, the infrared heaters and the hot air ovens enumerated in FIGS. 1 to 4, there can be utilized electrical resistance heating, dielectric heating or steam-heated platens or guide rolls. Similarly, as specified in U.S. Pat. No. 2,451,597, the temperature of the belt or drum, the coating layer, and the mass of coating composition employed in this invention should be precisely controlled by appropriate monitoring and control devices such as are well known in the art to achieve the most uniform and trouble-free operation and product.

For coating compositions that contain low-molecular-weight polymer fractions or compounding ingredients such as plasticizers or solvents that are volatilized, or that emit volatile degradation or thermosetting-reaction byproducts at the temperatures it is desired to use in the invention process to form the smear coating and/or to cure thermosetting compositions, there should be provided over the effected areas of the belt or drum and heating means, an air exhaust hood to remove these undesirable volatiles. Further, when it is desired to minimize oxidative degradation of the hot smear coating layer, oxygen should be excluded as by blanketing the coating layer with an inert gas such as carbon dioxide, nitrogen or helium.

In the processes of FIGS. 1 through 4, the means employed for forming the smear coating layer, further heating the coating layer, laminating to the substrate, and cooling, desirably should be positioned on either the belt or drum in as close a proximity to each other as possible to minimize the residence time of the coating layer at elevated temperatures, and thereby minimize the chance for thermal degradation of the coating layer or the substrate layers when thermosensitive.

Further, it will be readily apparent to those skilled in the art that these various heating, layer forming, laminating and cooling means and stations employed in the apparatus and process of this invention can be positioned along either the whole length of the metal belt or the whole periphery of the hollow metal drum if it is desired to minimize the size of the metal carrier. Ideally, of course, any heating means employed for post heating the layer of smear coating after it has been deposited on the metal carrier to effectuate a further smoothing and/or curing of the coating will be disposed in those areas of the metal carrier where the force of gravity can effectuate the desired flowing out and smoothing of the coating layer. When thermosetting coating compositions are used, it is, of course, mandatory that they retain their thermoplastic and adhesive character until laminated to the substrate after which they may be further heated to effect cure if desired or required prior to being cooled and taken off the belt.

The laminating pressure roll and the belt support roll can, as is known in the art, be made with a variety of materials and often will be rubber covered to ensure the application of uniform pressure across the width of the laminate. Further, the laminating roll and the support roll can, as described, be cored for circulation of a heating or cooling liquid therethrough. Also, the laminating roll can, as is known, be power driven at the same peripheral speed as the linear belt speed rather than relying on frictional contact, to minimize any possibility of slipping which might mar the surface of the substrate being laminated.

In addition to the extruder feeder means illustrated in FIG. 4 for ensuring long, continuous runs of the smear coating process, there can be used two feed boxes or coating composition cylinders positioned in tandem exteriorly of the carrier belt or drum so that one coating feed means would always be contacting the carrier, while the second was being reloaded.

The temperature of the surface of the endless metal belt or the hollow metal drum in smearing contact with the mass of the coating composition cannot be rigidly specified because it is interdependent not only on the coating composition and its inherent melting or quasi-liquification temperature and melt viscosity, and whether it is thermoplastic or thermosetting, but also on the surface texture and heat capacity of the metal carrier, the pressure with which the mass of the coating composition is forced in smearing contact with the belt, the thickness of the smear coating layer that is to be formed on the carrier, and the presence and temperature of auxiliary heating means disposed beneath the belt and/or in the feedbox in the form of the heating fins and heated sidewalls.

Normally the surface of the carrier will be of the order of 10° to 100° F. higher than the melting or quasi-liquification temperature of the coating composition. However, for extremely high speed operations and/or when the metal carrier possesses poor heat conduction properties, temperatures of the order of 200° or even 300° F. higher may be required. Thus depending on all these factors, a surface belt temperature in the range of 150° to 900° or even 1,000° F. will usually be employed in the process and coating apparatus of this invention.

Similarly, it is not possible to specify with exactness the peripheral speed of either the endless metal belt or the hollow metal drum that is used in this process. Like the temperature parameter, the peripheral speed of the metal carrier is interrelated with and interdependent upon the other process parameters including: the coating composition, its melting or quasi-liquification temperature and whether it is thermoplastic or thermosetting, and if thermosetting, the rapidity of cure; the heat conductance property, and the surface temperature and texture of the metal carrier; the pressure with which the mass of coating composition is forced against the carrier; the thickness of the smear coating layer that is to be formed; and finally the size, capacity and number of the various heating and cooling means employed at the different stations in the apparatus and process of this invention. Having in mind the consideration of all these process parameters, small coating apparatus of this invention having for example only 10 to 20 feet of metal carrier length upon which to position the belt preheating and the smear coating feeding, postheating, laminating, postlamination heating and cooling means and hence being limited in the size that these means can have may, for example, only be operated at speeds in the range of 15 to 90 feet per minute, while larger units having, for example, 25 to 120 feet of metal carrier length upon which to position these various means thus allowing larger units and which in the larger size would be an endless belt may be operated, for example, at speeds ranging from 90 up to 480 feet per minute.

The pressure employed for forcing the mass coating composition, in the feedbox or molded into a coating cylinder, into smearing contact with the moving metal carrier to form an essentially continuous layer of the smear coating, cannot be explicitly delineated because, as with the temperature and speed of the metal carrier, the coating feeding pressure that is required is interrelated with and interdependent on the other process parameters as previously discussed. Taking into consideration all of these factors, it may, for example, thus vary from as little as the autogenous pressure of the coating mass up to 15 pounds per square inch or even more for coating compositions that have high melting or quasi-liquification temperatures. It is apparent that the extruder-feedbox-pressure means combination illustrated in FIG. 4 provides a means of maintaining an essentially constant feed pressure when this is critical. Further, it is apparent that if coating conditions are chosen such that a significant pressure e.g., 5 pounds per square inch) is required to force a coating composition in a feedbox not equipped with an extruder or a coating composition molded into a cylinder against the moving metal carrier and a limited coating mass is used when the coating mass is above the carrier, then the percentage variation in the feeding pressure as the coating mass is consumed can be minimized e.g., to less than 5 percent. The variation induced by the decreasing coating mass can also be obviated or minimized by feeding the mass in an essentially horizontal direction against the moving metal carrier.

The cylinder mass of coating composition employed in the process and apparatus of this invention and illustrated in FIG. 2, can be prepared by any of the methods known to the art, care being taken to maintain its thermoplastic character to a degree sufficient to allow it to form a continuous layer of the desired coating. Thus for example, it might be formed by sintering together a particular composition, by casting a monomer and/or prepolymer composition and further polymerizing to the desired solid state, or by molding a solid composition with heat and/or pressure.

Qualitatively, the following relationships bear on the thickness of the smear coating layer that can be formed by the apparatus and process of this invention when a slidable gate is not employed on the feedbox or when a cylindrical mass of the coating composition is used. In these instances, the thickness of the smear coating layer is increased by:

1. Increasing the positive temperature differential between the temperature of the preheated metal carrier and the temperature of melting or quasi-liquification of the coating composition at the point of forming the smear coating layer upon the carrier.
2. Decreasing the linear speed of the moving endless belt or the peripheral speed of the revolving metal drum.
3. Increasing the temperature of the walls of the feedbox and/or the heat exchange fins disposed in the feedbox in close proximity to the metal carrier so as to more rapidly melt or quasi-liquify the mass of coating composition adjacent the metal carrier.
4. Increasing the roughness of the metal carrier surface when the adhesive mass is barely quasi-liquified or is being deposited on the carrier by a shredding or tearing coaction along with a smearing deposition.
5. Increasing the pressure forcing the mass of coating composition against the metal carrier.
6. Increasing the area of the mass of the coating composition being pressed against the moving metal carrier.
7. Employing a metal carrier having a higher heat capacity or better heat conductance properties.
8. Employing a coating composition that melts or becomes quasi-liquified at either lower temperatures or over a smaller temperature range. This can be achieved, as is known to those skilled in the art, by employing such compounding expedients as; substituting in total or in part for the polymer constituents of the coating composition one or more polymers having a smaller average molecular weight and/or a narrower molecular-weight distribution, and/or utilizing liquid or solid compounds that have a solvating action on the polymers and/or resins present in the coating composition at least at the elevated temperatures desired to form the coating layer and that may be either fugitive such as the low-boiling-point solvents or essentially nonfugitive and permanent such as the high-boiling-point plasticizers.

Conversely, thinner smear coating layers are produced by oppositely varying one or more of these process parameters. As discussed previously, all these parameters of the invention process and apparatus are interrelated and interdependent, thus permitting a wide latitude and flexibility in the choice of the processing conditions, coating compositions and substrates that can be utilized as will be readily apparent to those skilled in the art from the above description. To illustrate when it is desired, for example, to increase the speed of forming the smear coating while maintaining the thickness of the coating layer constant, this could be readily achieved by altering one or more of the following process variables to compensate for the increased carrier speed:

1. Increase the positive temperature differential between the metal carrier and the melting or quasi-liquification temperature of the coating composition mass by increasing the temperature of the metal carrier.
2. Increase the pressure forcing the mass of coating composition against the carrier.
3. Increase the contact area between the coating composition mass and the metal carrier.
4. Increase the temperature of the walls of the feedbox and/or the heat exchange fins disposed in the feedbox adjacent the metal carrier.

With the process and apparatus of this invention, it is possible to produce smear coating layers that can vary in thickness from extremely thin, as for example 0.10 mils, up to a practical maximum thickness of about 10 mils. Even thicker layers can be produced if the desired coating compositions can tolerate the slower carrier speeds and hence longer residence times at elevated temperatures that may be required. An alternate method of producing thicker layers is by laminating together two or more smear coating layers employing two or more of the smear coating apparatus of this invention in tandem or by using multiple passes when only one apparatus is available. Thin coating of the order of less than 1 mil usually are produced by control of the process parameters as hereinbefore described while thicker coating layers of the order of 5 mils and above are more uniformly produced and controlled by a coating thickness control means such as the slidably mounted gate mounted on the downstream side of the feedbox illustrated in FIGS. 1, 3 and 4. Between about 1 and 5 mils, the use of the gate will depend upon the coating composition and the coating process conditions it is desired to use, and may or may not be used. When the gate is employed, it may be advantageous, especially when the feedbox walls are not heated, to provide heating means such as electric heating elements or circulating heated fluid in the gate and to maintain it at a uniform temperature across its width that is in excess of the melting or quasi-liquification temperature of the coating composition to ensure a smooth, blemish-free coating.

Although the process and apparatus of this invention have described the moving metal carrier with reference to the preferred endless moving metal belt or revolving hollow metal drum, it is obvious that a metal carrier of definite length that was passed through the coating forming means and the various heating and cooling sequences that characterize this invention could also be used if desired.

Further, while the manufacture of a coated substrate in FIG. 2 and a laminated product in FIG. 4 has been illustrated and described with reference to processes wherein the coating layer has been directly heated to render it tacky and adhesive to the substrate(s), it will be obvious to the skilled artisan that the same results and products can be attained by heating a cooled, solidified coating layer indirectly by the expediency of heating the substrate(s) to a temperature that will heat reactivate the coating layer sufficiently to make it tacky and adhesive to the substrate, followed by solidification of the coating layer. A second obvious but less desirable expedient would employ a solvent for the purpose of reactivating the coating layer and rendering it adhesive to the substrate(s), followed by a conditioning treatment, such as a circulating hot air oven, to remove the solvent from the coated substrate or laminated product.

Additionally, while only one laminating roll and support roll have been illustrated in FIGS. 2, 3 and 4, it will be obvious to the skilled artisan that a series of contiguous laminating and support rolls and/or secondary pressure endless belts above and/or below the carrier may be required to hold the substrate and coating layer in touching relationship while the coating develops sufficient cohesive strength through solidification either by cooling or by curing to prevent delamination. This expedient may be necessary especially for more rigidlike substrates. Such supplementary rolls or belts may be heated or cooled to expedite the coating solidification.

Because of the proximity of the layer forming, lamination, and cooling steps and means that can be employed in the process and apparatus of this invention, it is possible to make either unsupported films, coated substrates or laminated products in which the smear coating layer is exposed to elevated temperatures for only a minimal time. In the case of the smaller apparatus of this invention running at 15 to 90 feet per minute, the time exposure of the coating layer to elevated temperatures can be of the order of 20 to 45 seconds. With larger units running at speeds from 90 up to 480 feet per minute or more, the residence time of the smear coating layer at elevated temperature can be of the order of seconds. It is this inherent characteristic of the coating process and apparatus of this invention that imparts to it the unique advantages that it has as compared to the other mass coating processes known to the prior art.

Thus, the invention process permits the formation of unsupported films, coatings, and adhesive layers from organic compositions that cannot be used by the presently known mass formation processes, because the compositions are hypersensitive to elevated temperature due either to degradation or too rapidly thermosetting.

Further, with this invention, it is possible to form coating or film layers at higher temperatures than are usually feasible with the calandering and extrusion processes, thus permitting the formation of layers of organic compositions that could not otherwise be utilized. In addition and for the same reason, unsupported films and coated substrates can be produced that are essentially free of the residual stresses present in many calandered and extruded products.

In addition, the apparatus of this invention is simpler in principle, lower in cost, and easier and less expensive to operate and maintain than a calander or an extruder.

Additionally, the invention process obviates or minimizes the need for solvents and diluents and their attendant disadvantage of cost, fire hazards, toxicity and air pollution.

Further, it is apparent from the above description that the invention process is extremely flexible and allows for a broader latitude in the choice of the optimum conditions required for preparing unsupported films, coated substrates, and laminated products than the processes presently known and used by the art. Consequently, this invention permits the use of substrates and layer-forming organic compositions that presently cannot be readily used, thus allowing the manufacture of a more universal variety of products.

As employed in the description and claims of this invention, the term "quasi-liquify" encompasses not only melting of the solid or virtually solid organic coating composition to give a continuous smear coating layer but also those cases when the coating compositions only become sufficiently thermoplastic to be torn or shredded off the mass of coating composition by the moving metal carrier and form a unitary layer and/or adhere to substrates by a sintering type bonding of the resulting particles or shreds to themselves and/or the substrates. In the case of a sintering formation and/or bonding, the coating layer, while being unitary may not be continuous in the commonly understood sense.

Similarly the terms "virtually solid" or "solid" can encompass masses of particulate organic coating compositions that may only be sintered together. When particulate compositions are used, it is necessary that they be unitary, that is at least be sintered together in the proximity of the metal carrier. Further, the term "virtually solid" encompasses masses of organic coating compositions that may have some character of a liquid in that they will exhibit cold flow over an extended period, but are not sufficiently fluid to form coating layers by conventional fluid-coating processes.

Because of the reduced residence time at elevated temperatures and/or the capability to utilize higher temperatures for forming films and coating, the process and apparatus of this invention can utilize any solid or virtually solid organic composition that can be at least quasi-liquified by the moving heated metal carrier and postheating means when required that characterize this invention to form an essentially unitary and/or continuous coating layer.

Consequently, the invention is adapted to utilize virtually every solid organic composition having the above characteristics and including those formed into layers by the presently known mass manipulation methods such as the calandering process, the extrusion process, the hot-melt process and the powder-fusion process, as well as the solution and dispersion manipulation methods. Exemplary of some of the organic compositions that can be used are those containing one or an admixture of two or more of the following rubbers, polymers and resins; natural rubber, butadiene polymers and copolymers made with styrene, acrylonitrile, etc., chloroprene polymers and copolymers, isoprene polymers and copolymers, isobutylene polymers and copolymers, urethane polymers, urethane-urea polymers, acrylate and methacrylate ester polymers and copolymers, vinyl ether polymers and copolymers, vinylidene chloride polymers and copolymers, styrene polymers and copolymers, vinyl cyanide polymers and copolymers, acrylamide and methacrylamide polymers and copolymers, vinyl chloride polymers and copolymers, vinyl acetate polymers and copolymers, polyethylene phthalates, epoxy resins, polyamide resins, polycarbonates, polysulfones, polyphenylene oxides, polyacetals, ethyl cellulose, cellulose acetate, phenol-aldehyde resins, amino-aldehyde resins, alkyd resins, silicone polymers and copolymers, fluorine-containing polymers and copolymers, polysulfides, ethylene and propylene polymers and copolymers, polyterpene resins, petroleum resins, naturally occurring and chemically modified resins and waxes, and so forth.

The organic compositions may consist of only rubbers, polymers and/or resins or may further contain auxiliary compounding ingredients as are well known in the art such as reinforcing pigments and fibers, fillers, colorants, antidegradants, curing agents, plasticizers, processing aids, tackifying resins and so forth. To facilitate the preparation of and/or the melting or quasi-liquification of the organic composition in the formation of a coating layer, it may contain, in addition to essentially permanent plasticizers, lower-boiling-point solvents that can essentially be volatilized off by the post layer-forming heating steps employed in the invention process. Normally when this expedient is required, no more than 25 percent by weight of the solvent will be required. However, for most coating compositions, this expedient will neither be required nor desirable because of the higher melting or quasi-liquification temperatures that can be used for coating compositions in this invention as compared to the prior art processes.

In preparing the coated substrates and laminated products with the process and apparatus of this invention, there can be used as the substrate any material presently employed in the methods of the prior art. Thus, for example, there may be used sheets and foils of metals, sheets and films of plastic materials, wood sheets, paper webs, textile webs and so forth. They may, if required, as known in the art, be pretreated, precoated, or preimpregnated with a variety of materials to impart properties required in the final product such as increased adhesion, cohesive strength, corrosion resistance, release properties, and so forth.

While the major application for the process and apparatus of this invention will be for flexible substrates and bases such as have been illustrated and described hereinbefore, it can also be used for coating rigid, flat substrates of fixed lengths by adaptation of the apparatus described herein as will be readily apparent to those skilled in the art.

The process and apparatus of this invention can be used to manufacture products such as plastic films used for packaging, alkyd resin- and plastic-coated aluminum and steel sheeting used for building products and appliances, pressure sensitive adhesive tapes and labels, textile-backed flexible PVC sheeting used for clothing and upholstery and the like. The above illustrates just a few of the multitude of products that can be produced by the apparatus and process of this invention. Many others will be readily apparent to those skilled in the film, coating and laminating industries.

While illustrations and description of some of the preferred apparatus and processes have been provided in the above description in considerable detail to enable the artisan to practice this invention, practical considerations prevent describing all the permutations of this invention. It is considered, however, that with the above description, such permutations will be readily apparent to the skilled workers in the film, coating and lamination arts, and that they are to be included within the scope and spirit of this invention as defined by the following claims.

What is claimed is:

1. A process for producing a coated substrate wherein the coating is derived from a solid organic coating composition that is capable of being liquified at elevated temperatures which comprises:
   providing a metal traveling carrier;
   heating the carrier;
   pressing a mass of the solid coating composition against a surface of the traveling carrier;
   heating and liquifying essentially only that part of the mass of the coating composition contiguous with and adjacent to the carrier to the extent that it will adhere and transfer to the carrier as a smear coating;
   forming and depositing directly on the surface of the carrier an essentially unitary smear coating derived solely from the heated and liquified part of the coating composition mass;
   then applying a substrate to the coating deposited on the carrier with sufficient pressure to adhere the coating to the substrate, thereby to produce a coated substrate;
   removing the coated substrate from the carrier.

2. The process of claim 1 which further comprises:
   reactivating the coating of the coated substrate sufficiently to cause it to adhere to a second substrate;
   laminating a second substrate to the coating.

3. The process of claim 1 which further comprises:
   heating the coating of the coated substrate after its removal from the metal carrier.

4. The process of claim 1 which further comprises:
   prior to laminating the substrate to the coating, cooling the surface of the coating contiguous with the surface of the metal carrier while maintaining the opposite surface of the coating at a temperature that will effectuate adhesion of the coating to the substrate.

5. The process of claim 1 which further comprises preheating the carrier prior to contacting the mass against the surface thereof.

6. The process of claim 1 which further comprises heating that area of the carrier against which the mass is pressed.

7. The process of claim 1 which further comprises replenishing the mass as it is consumed.

8. The process of claim 1 which further comprises heating the substrate prior to laminating it to the coating.

9. The process of claim 1 in which the mass is heated prior to contacting the surface of the carrier.

10. The process of claim 1 further characterized in that the mass is rotated about an axis transversely disposed to the direction of travel of the surface of the carrier.

11. The process of claim 1 further characterized in that the metal traveling carrier is a traveling endless metal belt bridging at least two spaced rolls.

12. The process of claim 1 which comprises further heating the smear coating subsequent to deposition on the carrier and prior to laminating to the substrate.

13. An apparatus for producing a coated substrate having a coating derived from a solid organic coating composition which comprises:
   a supported metal carrier adapted for travel;
   means for moving the carrier in a predetermined direction of travel;
   means for holding and feeding a mass of the solid organic coating composition in contact with a surface of the carrier;
   pressure means associated with the holding and feeding means, for pressing the mass of the coating composition against the surface of the carrier, said pressure means being nonrotatable;
   heating means for liquifying essentially only that part of the mass of the coating composition contiguous with and adjacent to the surface of the carrier so that passage of the carrier against the liquified part of the mass produces a smear coating thereof on the surface of the carrier;
   means, downstream the direction of travel from the holding and feeding means, for laminating a substrate to the coating to produce a coated substrate;
   means, downstream the direction of carrier travel from the laminating means, for removing the coated substrate from the carrier.

14. The apparatus of claim 13 adapted to produce a laminated product from the coated substrate which further includes:
   a second carrier, adapted for movement, disposed downstream from the coated substrate removing means and so associated with the metal carrier as to receive and carry the coated substrate with the smear coating layer exposed;
   means, associated with the second carrier, for reactivating the smear coating layer to render it adhesive to a second substrate;
   means, associated with the second carrier downstream its direction of movement from the reactivating means, for laminating the second substrate to the smear coating layer to form a laminated product;

means, associated with the second carrier downstream its direction of movement from the laminating means, for removing the laminated product from the second carrier.

15. The apparatus of claim 13 which further includes means disposed between the holding-feeding means and the laminating means for cooling the surface of the coating contiguous with the surface of the metal carrier and means for maintaining the opposite surface of the coating at a temperature which will effectuate adhesion of the coating to the substrate.

16. The apparatus of claim 13 further characterized in that the heating means comprises means for heating the carrier upstream its direction of travel from the holding and feeding means.

17. The apparatus of claim 13 further characterized in that the heating means comprises means for heating the carrier in the area in which the holding and feeding means is associated with the carrier.

18. The apparatus of claim 13 further characterized in that the heating means comprises means for heating the mass prior to contacting the carrier.

19. The apparatus of claim 13 in which the holding-feeding means comprises:
   a rotatable member around which the mass of the coating composition is concentrically disposed in the shape of a cylinder;
   means, for supporting the rotatable member against the metal carrier transversely its direction of travel.

20. The apparatus of claim 13 which further includes means, between the holding-feeding means and the laminating means, for heating the smear coating layer to effectuate further unification, fusion and distribution of the coating layer and thereby to provide a coating layer that is more uniform.

21. The apparatus of claim 13 in which the metal carrier is an endless metal belt and the supporting means are at least two spaced rolls around which the belt travels.

22. The apparatus of claim 13 in which the metal carrier is a hollow metal drum.

23. The apparatus of claim 13 in which the holding and feeding means is a receptacle having an opening contiguous with the metal carrier through which the coating composition mass is forced against the metal carrier by the pressure means.

24. The apparatus of claim 23 in which the receptacle is equipped with an extruder to replenish the mass of the coating composition in the receptacle as it is consumed.

25. The apparatus of claim 23 in which the receptacle is equipped with means for controlling the temperature of the mass of the coating composition.

26. The apparatus of claim 23 in which the receptacle is equipped with means to control the thickness of the smear coating layer.

27. The apparatus of claim 26 in which the thickness control means is a gate adjustably mounted at the downstream side of the receptacle and includes heating means.

28. A process for producing a coated substrate wherein the coating is derived from a solid organic coating composition which comprises:
   providing a metal traveling carrier;
   pressing a mass of the solid coating composition against a surface of the carrier;
   particulating that part of the mass of the coating composition contiguous with and adjacent to the surface of the carrier;
   forming and depositing on the surface of the carrier a layer of particulate coating composition;
   then heating the layer to produce a unitary coating;
   laminating a substrate to the coating to produce a coated substrate;
   removing the coated substrate from the carrier.

* * * * *